United States Patent [19]

Sargisson et al.

[11] 4,068,470
[45] Jan. 17, 1978

[54] GAS TURBINE ENGINE WITH CONVERTIBLE ACCESSORIES

[75] Inventors: Donald F. Sargisson; Arthur P. Adamson, both of Cincinnati, Ohio

[73] Assignee: The United States of America as represented by the Administrator of the National Aeronautics and Space Administration, Washington, D.C.

[21] Appl. No.: 522,109

[22] Filed: Nov. 8, 1974

[51] Int. Cl.² .................. F02K 3/02; F16H 35/00; F16H 1/14
[52] U.S. Cl. .................. 60/226 R; 74/385; 74/417
[58] Field of Search .......... 74/417, 423, 385; 60/226 R, 39.31

[56] References Cited

U.S. PATENT DOCUMENTS

| 2,803,943 | 8/1951 | Rainbow | 60/39.31 X |
|---|---|---|---|
| 2,815,834 | 12/1957 | Mall | 74/385 X |
| 2,932,443 | 4/1960 | Gunberg | 74/417 |
| 2,978,209 | 4/1961 | Kerry | 244/54 |
| 3,269,118 | 8/1966 | Benedict et al. | 60/39.31 |
| 3,478,620 | 11/1969 | Shimanckas | 74/417 X |
| 3,608,684 | 9/1971 | Shimanckas | 74/417 X |
| 3,638,421 | 2/1972 | Chilman | 60/39.31 |
| 3,779,006 | 12/1973 | Lewis et al. | 60/39.11 |
| 3,786,691 | 1/1974 | Lindstrom | 74/417 X |
| 3,792,586 | 2/1974 | Kasmarik et al. | 60/226 R |
| 3,799,476 | 3/1974 | Bouiller et al. | 244/60 X |
| 3,830,058 | 8/1974 | Ainsworth | 60/226 R |

*Primary Examiner*—Leonard H. Gerin
*Attorney, Agent, or Firm*—Norman T. Musial; Robert C. Lampe, Jr.; Derek P. Lawrence

[57] ABSTRACT

Drive means for connecting a gas turbine engine to its accessories are so constructed as to allow the accessories to be selectively positioned to any one of several predetermined circumferential positions about the perimeter of the engine. This feature permits convenient mounting of the same engine upon vehicles demanding radically different engine mounting arrangements.

5 Claims, 2 Drawing Figures

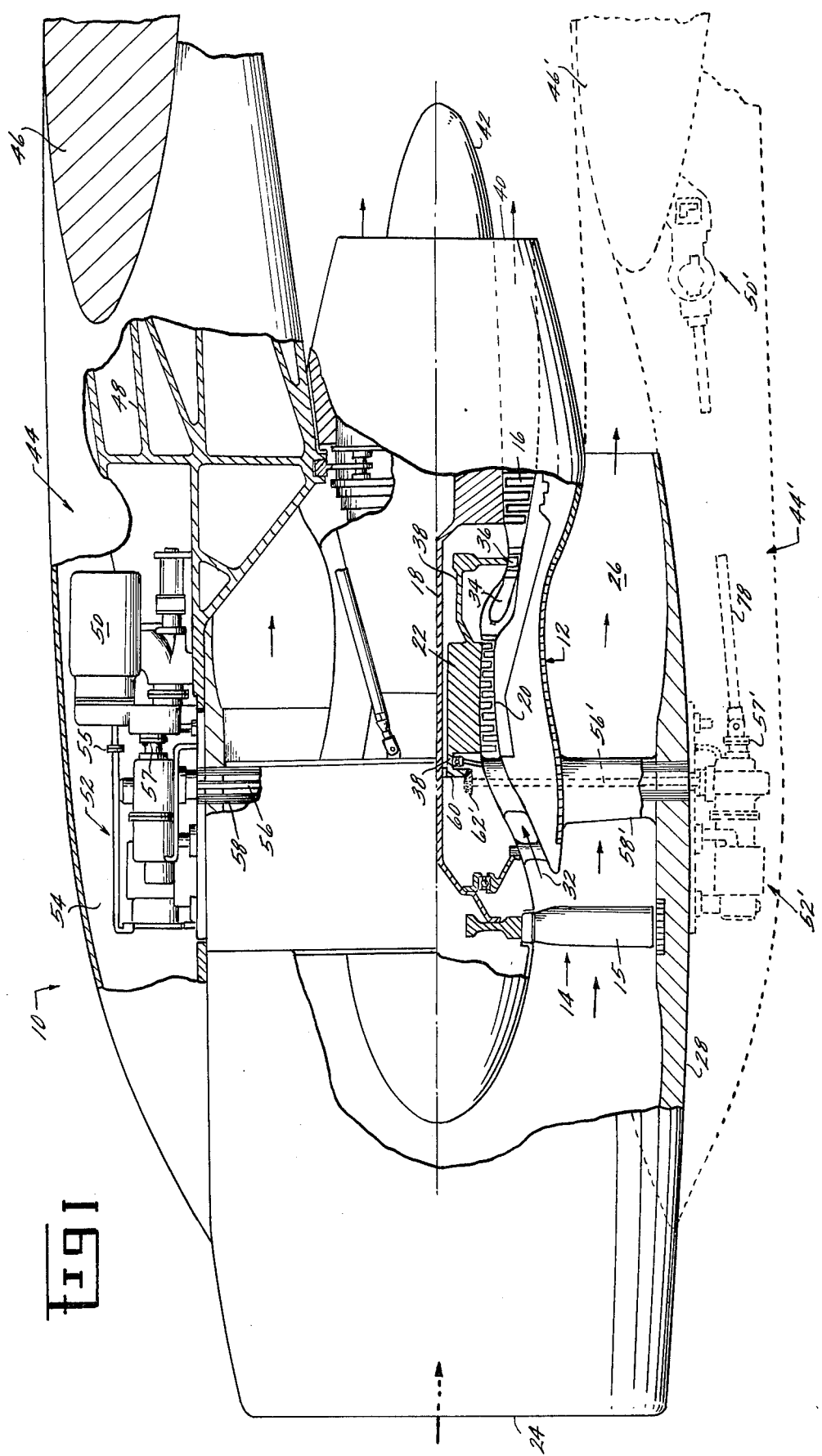

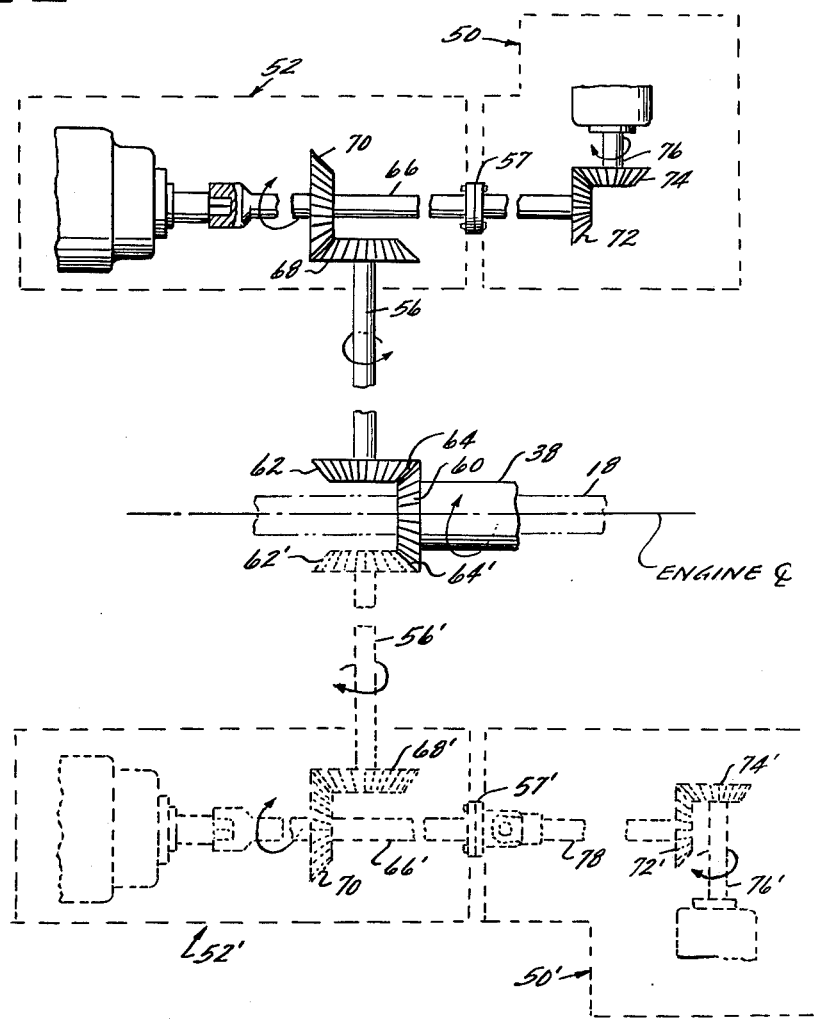

GAS TURBINE ENGINE WITH CONVERTIBLE ACCESSORIES

The invention described herein was made in the performance of work under a NASA contract and is subject to the provisions of Section 305of the National Aeronautics and Space Act of 1958, Public Law 85-568(72 Stat. 435; 42 USC 2457).

BACKROUND OF THE INVENTION

This invention relates to gas turbine engines and, more particularly, to engine-driven accessories for use therewith.

Jet engines for powering aircraft are provided with engine-driven accessories to provide essential service and regulatory functions. These accessories are typically mounted upon the engine casing structure and, as with the remainder of the engine, are typically enclosed in a nacelle or other streamlined structure which envelopes the engine to reduce overall aerodynamic drag. However, as the complexity of accessories steadily increases, and the space available within the nacelle remains at best the same, the gas turbine engine designer is faced with the dilemma of where to locate the accessories so as not to increase the nacelle diameter with consequent drag penalties.

The problem is compounded when gas turbine designers are also faced with having to configure their engines for various unique applications demanding radically different engine mounting arrangements. For example, in the aeronautics field it is contemplated that the same basic aircraft engine will find application in aircraft having conventional under-the-wing (UTW) pylon mounting, and yet also be required for adaptation to aircraft having over-the-wing (OTW) engine mounting. The latter configuration appears extremely attractive for short take-off and landing (STOL) aircraft where the gas turbine engine exhaust will be used to provide aircraft wing lift augmentation by the Coanda effect of blowing across the upper surface of a wing and connected flap system.

Since essential aircraft accessories are powered by the gas turbine engine, it is common to locate the aircraft and engine accessories in close relative proximity to be driven by a common engine power shaft. On advanced engines such as the General Electric CF6-50 engine, all engine-driven accessories are mounted on a gearbox located on the engine fan casing at the bottom of the engine, within the nacelle. However, such an arrangement necessitates relatively complex plumbing to operatively connect the accessories to the aircraft, since the accessories are located on the bottom of the engine while the engine is typically suspended from the aircraft wing by a structure known as a pylon, the point of attachment being at the top of the engine.

It can be appreciated, therefore, that in order to obtain highly streamlined nacelles such as taught in co-pending application Ser. No. 592,108, filed Nov. 8, 1974, Adamson et al, entitled "An Integrated Gas Turbine Engine-Nacelle," assigned to the same assignee as the present invention, and yet maintain flexibility in engine mounting configurations, it would be advantageous to have the engine-driven accessories external of the nacelle and located at the optimum circumferential location consistent with particular aircraft mounting. Ideally, any one particular engine should not be limited to one circumferential location for its driven accessories since this would preclude switching from a UTW aircraft to an OTW aircraft without engine tear-down and reassembly to replace incompatible hardware. It is conceivable, as attested by the current trend of airlines to standardize their fleets, that an engine could be used on more than one type of aircraft application. The problem facing the engine manufacturer, therefore, is to provide an accessory arrangement which will permit engine adaptation to various aircraft configurations, and additionally provide for nacelle steamlining. Although this invention is directed particularly to aircraft propulsion systems, it will become apparent that the invention is equally applicable to all vehicles utilizing gas turbine engine propulsion.

SUMMARY OF THE INVENTION

The object of the present invention, therefore, is to provide a convertible accessory drive arrangement, preferably external to the gas turbine engine nacelle, which offers flexibility for varying mounting configurations. This and other objects and advantages will be more clearly understood from the following detailed description, drawings and specific examples, all of which are intended to be typical of rather than in any way limiting to the scope of the present invention.

Briefly stated, the above object is attained by locating the engine accessory package external to the nacelle structure such that it fits within a pocket formed within the aircraft or its pylon. A drive shaft extends from the accessory package, through a hollow strut, into engagement with the main core engine shaft drivingly connecting the compressor and turbine portions. At least one other hollow strut is provided so that, if it is desirable to relocate the accessories, they may be removed and the drive shaft withdrawn from the first strut. Subsequently, the drive shaft may be reinstalled within the second hollow strut, thus re-engaging in driving connection the core engine shaft and the accessories.

DESCRIPTION OF THE DRAWING

FIG. 1 is a composite schematic representation of a gas turbine engine incorporating the subject invention, the engine being mounted in either of two different configurations; and FIG. 2 is an enlarged composite schematic representing one embodiment of the subject invention.

DESCRIPTION OF THE PREFERRED EMBODIMENT

Referring to the drawings wherein like numerals correspond to like elements throughout, reference is first directed to FIG. 1 wherein an engine depicted generally at 10 and embodying the present invention is diagrammatically shown. This engine may be considered as comprising generally a core engine 12, a fan assembly 14 including a stage of fan blades 15, and a fan turbine 16 which is interconnected to the fan assembly 14 by shaft 18. The core engine 12 includes an axial flow compressor 20 having a rotor 22. Air enters inlet 24 and is initially compressed by fan assembly 14. A first portion of this compressed air enters the fan bypass duct 26 defined, in part, by core engine 12 and a circumscribing fan nacelle 28 and discharges through a fan nozzle 30. A second portion of the compressed air enters inlet 32, is further compressed by the axial flow compressor 20 and then is discharged to a combustor 34 where fuel is burned to provide high energy combustion gases which drive a turbine 36. The turbine 36, in turn, drives the rotor 22 through a shaft 38 in the usual manner of a gas turbine engine. The hot gases of combustion then pass to and drive the fan turbine 16 which, in turn, drives the fan assembly 14. A propulsive force is thus obtained by the action of the fan assembly 14 discharging air from the fan bypass duct 26 through the fan nozzle 30 and by the discharge of combustion gases from a core engine nozzle 40 defined, in part, by plug 42. The above description is typical of many present-day gas turbine engines and is not meant to be limiting, as it will become readily apparent from the following descriptions that the present invention is capable of application to any gas turbine engine and is not necessarily restricted to gas turbine engines of the turbofan variety. The foregoing description of the operation of the engine depicted in FIG. 1 is, therefore, merely meant to be illustrative of one type of application.

Continuing with the description of the embodiment of the invention as depicted in the upper portion of FIG. 1, it is shown therein that engine 10 is suspended from a pylon depicted generally at 44 which, in turn, is suspended from and integral with an aircraft wing 46 by means of truss structure 48. The aircraft propulsion mounting system herein discussed is provided as an example of possible uses for the subject invention as it will become apparent that the invention is equally applicable to all vehicles utilizing gas turbine propulsion. This configuration is representative of under-the-wing (UTW) engine mounting. Pylon 44 is shown to include, and have disposed within, aircraft accessories depicted generally at 50. Critical engine accessories depicted generally at 52 are located within a pocket 54 of the pylon 44 although they are an integral part of the engine hardware. Appropriate disconnects are provided, as at 55 and 57, to allow separation of the engine from the pylon and aircraft accessories. The engine accessories are drivingly connected to the core engine 12 through a driving means, such as a drive shaft 56, which is routed through one of a plurality of struts 58 spanning the fan bypass duct 26.

Referring now to FIG. 2, there is schematically depicted in greater detail the accessory drive arrangement of FIG. 1. The upper half of FIG. 2 is consistent with the OTW mounting arrangement hereinbefore discussed. The core engine shaft 38 is shown to have integral therewith a first gear means, such as bevel gear 60. Drive shaft 56 includes a second gear means such as bevel gear 62, which drivingly engages bevel gear 60 as at 64. Drive shaft 56 is operatively connected to an engine accessories drive shaft 66 by known geared engagement means such as bevel gears 68 and 70, the accessory drive shaft 66 being an integral portion of the engine accessories denoted generally at 52. The aircraft accessories, generally denoted at 50, are drivingly connected to the drive shaft 56 as by cooperating bevel gears 72 and 74, and shaft 76.

In a modified configuration shown is phantom in FIG. 1 and 2, the engine accessory package is adapted for an over-the-wing engine mounting arrangement. As depicted in phantom in FIG. 1, it is shown therein that engine 10 is mounted over a wing 46' by means of cooperating pylon assembly 44'. The engine accessories 52' are here mounted below the engine, external to the nacelle 28 and located within pylon 44'. Again, the engine accessories are drivingly connected to core engine 12 by means of drive shaft 56' which has now been inserted through a hollow strut 58' located at the bottom of the engine. The aircraft accessories 50' are located further aft in this configuration as a result of special consideration and are driven by shaft 78.

As clearly shown in phantom in FIG. 2, the meshing of bevel gears 60 and 62' occurs at 64', but by virtue of bevel gears 68' and 70', the direction of rotation of accessory drive shaft 66' remains unchanged as depicted by the rotational arrows. This ensures proper operation of all accessory components without the necessity of modification.

In operation, when it is desired to switch the engine from a UTW configuration to an OTW configuration, the operator merely has to disconnect the engine accessories 52 from the aircraft accessories 50, pull the engine accessories and drive shaft 56 from strut 58 and engagement with core shaft 38, and reinsert the assembly into another hollow strut 58' whereupon engagement with core shaft 38 is re-established. Alternatively, a plurality of drive shafts, such as 56 and 56', could remain operatively connected to the core shaft 38 with the point of engine accessory disengagement occurring between gears 68 and 70. Appropriate blank-off plates (not shown) would serve to cover the drive shafts not being used. This arrangement would be applicable where it was desired to mount the engine accessories in the pylon structure and have them remain there when the engine and nacelle structure was dismounted from the aircraft. Such an arrangement is particularly attractive from an aircraft operator's point of view since he need maintain a supply of accessories approximately equal to his aircraft needs, independent of the number of spare engines on hand. Therefore, the operator may maintain a minimum engine build-up unit comprising the minimum required engine components, thus enhancing his quick-engine-change capability. Yet another alternative would include redundant drive shaft gears 62 and 62'(FIG. 2) permanently installed in the engine, the remainder of the drive shaft 56 being so constructed as to permit a driving connection with either gear. This arrangement is attractive where the required size of the gear is greater than the available hole through which it would otherwise have to pass.

It should be obvious to one skilled in the art that certain changes can be made to the above-described invention without departing from the broad inventive concepts thereof. for example, as previously mentioned, the above invention is applicable to any gas turbine engine and is not limited to those of the gas turbofan variety. Further, it is contemplated that alternative gearing arrangements are possible in order to achieve the broad inventive concepts of the subject invention. Still further, it is readily apparent that the subject invention is not limited to over-the-wing and under-the-wing applications, but is applicable when accessories convertibility is desired between any two or more accessory mounting locations on any gas turbine engine propelled vehicle.It is intended that the appended claims cover these and all similar variations of the present invention's broader inventive concepts.

What is claimed is:

1. A gas turbine engine comprising:
  a core engine including a core shaft;
  a nacelle partially circumscribing said core engine;
  first gear means within said core engine and driven by said core shaft;
  a plurality of circumferentially spaced hollow struts extending radially between said core engine and said nacelle and in general axial alignment with said first gear means;

convertible accessory means disposed external to said nacelle and in general alignment with one of said struts; and drive shaft means, one end of which is drivingly connected to said accessory means, and the other end of which includes a second gear means insertable into any of said hollow struts and into driving engagement with said first gear means, and wherein said first gear means and said second gear means may be disengaged by withdrawing said drive shaft means radially outwardly with respect to said core shaft.

2. The gas turbine engine of claim 1 wherein said first gear means and said second gear means are bevel gears.

3. The gas turbine engine of claim 2 wherein said drive shaft means is integral with said accessory means and removable from the engine therewith.

4. The gas turbine engine as recited in claim 1 wherein said first gear means is disposed upon said core shaft.

5. A gas turbine engine comprising:
a core engine including a core shaft;
a nacelle partially circumscribing said core engine;
first gear means within said core engine and driven by said core shaft;
a plurality of circumferentially spaced hollow struts extending radially between said core engine and said nacelle and in general axial alignment with said first gear means;
convertible accessory means disposed external to said nacelle and in general alignment with one of said struts; and
a plurality of circumferentially spaced drive shaft means in geared engagement with said first gear means, and wherein said accessory means are operatively connected to one of said drive shaft means.

* * * * *